(12) United States Patent
Lu (10) Patent No.: US 7,746,635 B2
(45) Date of Patent: Jun. 29, 2010

(54) CHIP CARD CATCHING MECHANISM AND PORTABLE ELECTRONIC DEVICE USING THE SAME

(75) Inventor: Chi-Chung Lu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 196 days.

(21) Appl. No.: 12/118,968

(22) Filed: May 12, 2008

(65) Prior Publication Data

US 2009/0141445 A1    Jun. 4, 2009

(30) Foreign Application Priority Data

Nov. 30, 2007   (CN) .................... 2007 1 0202803

(51) Int. Cl.
   *G06F 1/16* (2006.01)
(52) U.S. Cl. ............... 361/679.55; 361/749; 439/488; 257/783; 235/449
(58) Field of Classification Search ............... 361/737, 361/749, 679.33, 679.32, 679.55, 679.41, 361/679.46, 679.56; 206/701, 312; 439/607.06, 439/326, 65, 488, 159; 257/698, 679, 787, 257/783; 235/492, 382, 380, 449
See application file for complete search history.

(56) References Cited

U.S. PATENT DOCUMENTS 5,196,994 A *  3/1993  Tanuma et al. ............... 361/737
6,477,043 B2 * 11/2002  McKnight .............. 361/679.33

FOREIGN PATENT DOCUMENTS

CN        2459686 Y    11/2001

* cited by examiner

*Primary Examiner*—Hung V Duong
(74) *Attorney, Agent, or Firm*—Andrew C. Cheng (57) ABSTRACT

A chip card catching mechanism installed in a body of a portable electronic device for receiving and securing a chip card is provided. The chip card catching mechanism includes a base, a housing, and a hatch. The base includes a connector arranged thereon for electrically connecting to the chip card. The housing includes a top cover and a circumferential wall extending from edges of the top cover. The top cover is arranged over the connector of the base with the wall therebetween and a hatchway is defined on the circumferential wall. The hatch is rotatably fixed to on two sides of the hatchway for exposing or hiding the hatchway. Further, a portable electronic device using the chip card catching mechanism is also provided.

18 Claims, 7 Drawing Sheets

CHIP CARD CATCHING MECHANISM AND PORTABLE ELECTRONIC DEVICE USING THE SAME

BACKGROUND OF THE INVENTION

1. Field of the Invention

The present invention relates to a chip card catching mechanism for receiving and securing a chip card and a portable electronic device using the same.

2. Discussion of the Related Art

With the rapid development of communications, the use of mobile phones, personal digital assistants (PDA), and other portable electronic devices are becoming increasingly popular. Consequently, the demand for various functions of the portable electronic devices, such as storing personal information in chip cards, also grows at the same time. Therefore, there are a variety of chip cards, such as secure digital memory cards (SD cards), compact flash cards (CF cards), subscriber identification module cards (SIM cards), that can be equipped within portable electronic devices.

However, the typical receiving space and securing device for chip cards are usually arranged below a battery of a given portable electronic device. Under the circumstance, the user must remove the battery to gain access to the chip card. As a result, the replacement of chip cards is quite inconvenient for the users.

SUMMARY

In one aspect, a chip card catching mechanism is installed in a body of a portable electronic device for receiving and securing a chip card. The chip card catching mechanism includes a base, a housing, and a hatch. The base includes a connector arranged thereon for electrically connecting to the chip card. The housing includes a top cover and a circumferential wall extending from edges of the top cover. The top cover is arranged over the connector of the base with the wall therebetween and a hatchway is defined on the circumferential wall. The hatch is rotatably fixed to two sides of the hatchway for exposing or hiding the hatchway.

Other advantages and novel features of the present card catching mechanism will become more apparent from the following detailed description when taken in conjunction with the accompanying drawings.

BRIEF DESCRIPTION OF THE DRAWINGS

Many aspects of the present card catching mechanism can be better understood with reference to the following drawings. The components in the drawings are not necessarily to scale, the emphasis instead being placed upon clearly illustrating the principles of the present card catching mechanism. Moreover, in the drawings, like reference numerals designate corresponding parts throughout the several views.

DETAILED DESCRIPTION OF THE EMBODIMENTS

Figure 1:
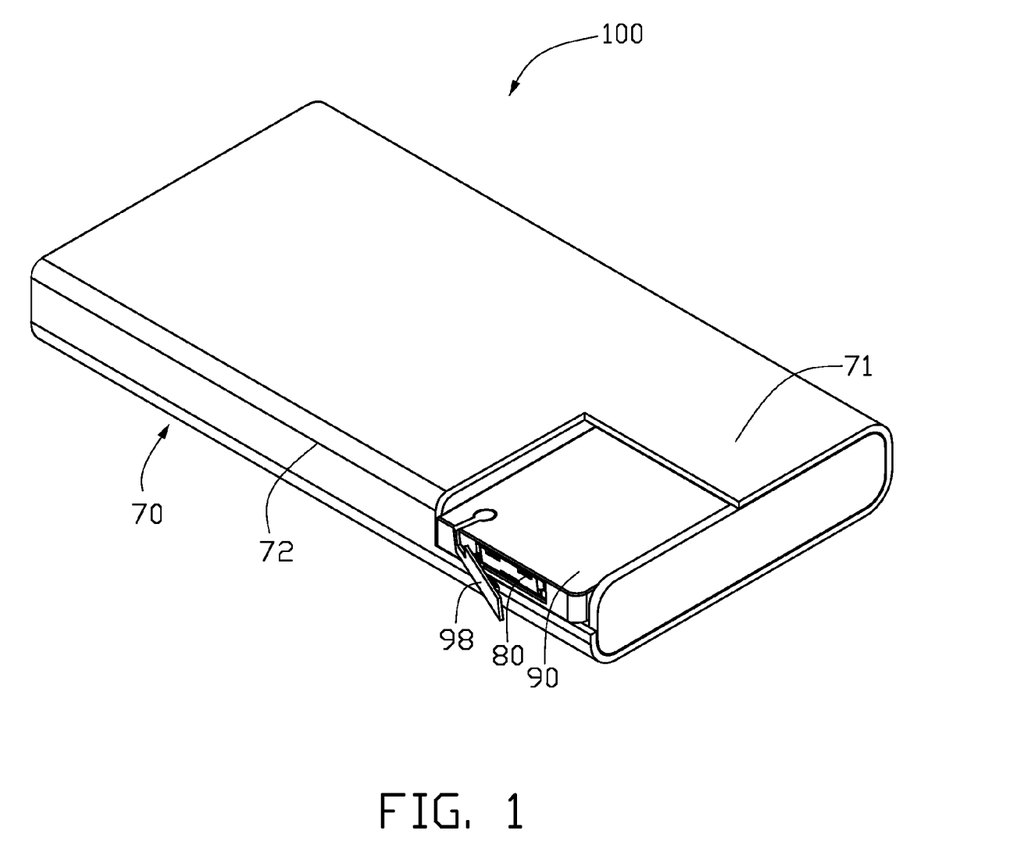
FIG. 1 is an isometric view of the card catching mechanism in a chassis arranged within the portable electronic device according to a present embodiment.
Figure 2:
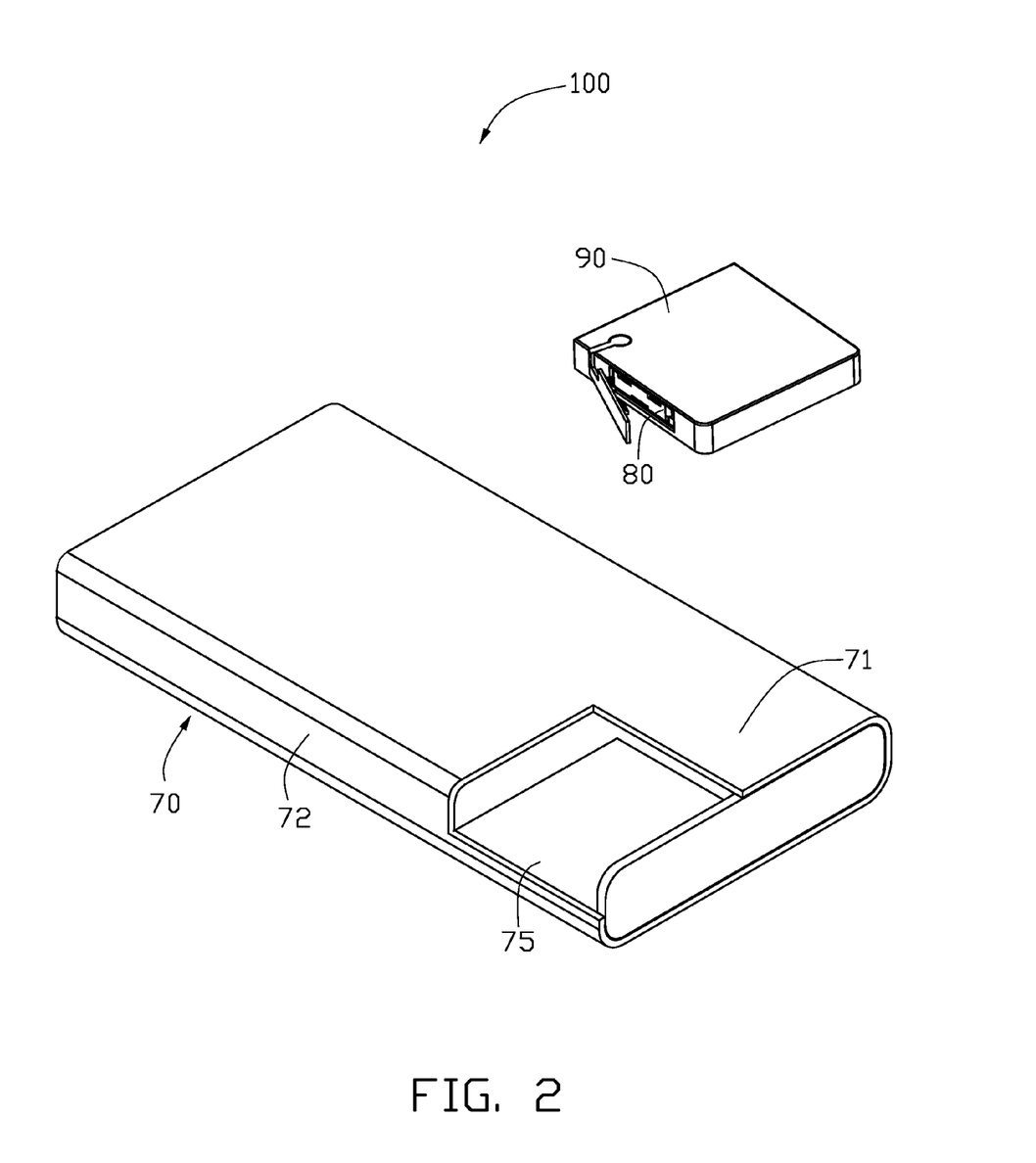
FIG. 2 is similar to FIG. 1 but with the chassis and card catching mechanism out of the portable electronic device.

Referring to the drawings in detail, FIGS. 1 and 2 show a portable electronic device 100 including a body 70, a card catching mechanism 80 and a chassis 90. The body 70 includes an top surface 71 and a side portion 72, and defines a recess 75 in the top surface 71 and the side portion 72. The card catching mechanism 80 for receiving and securing a chip card 10 (please refer to FIG. 7) is received in the recess 75 of the body 70 and is covered by the chassis 90. The chip card 10 may be a SD card, a CF card, a SIM card and so on.

Figure 3:
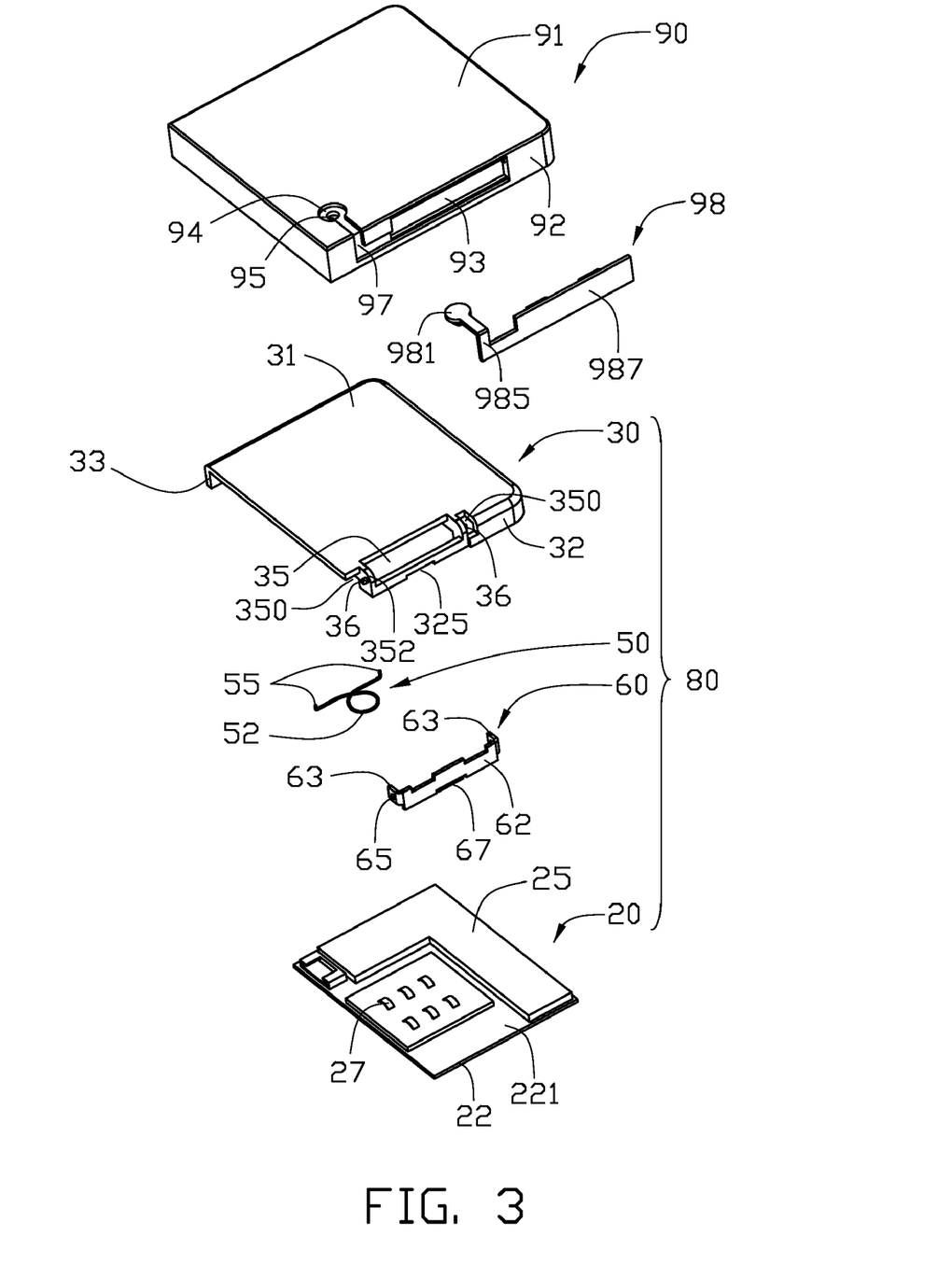
FIG. 3 is an exploded isometric view of the card catching mechanism and the chassis of FIG. 2.
Figure 4:
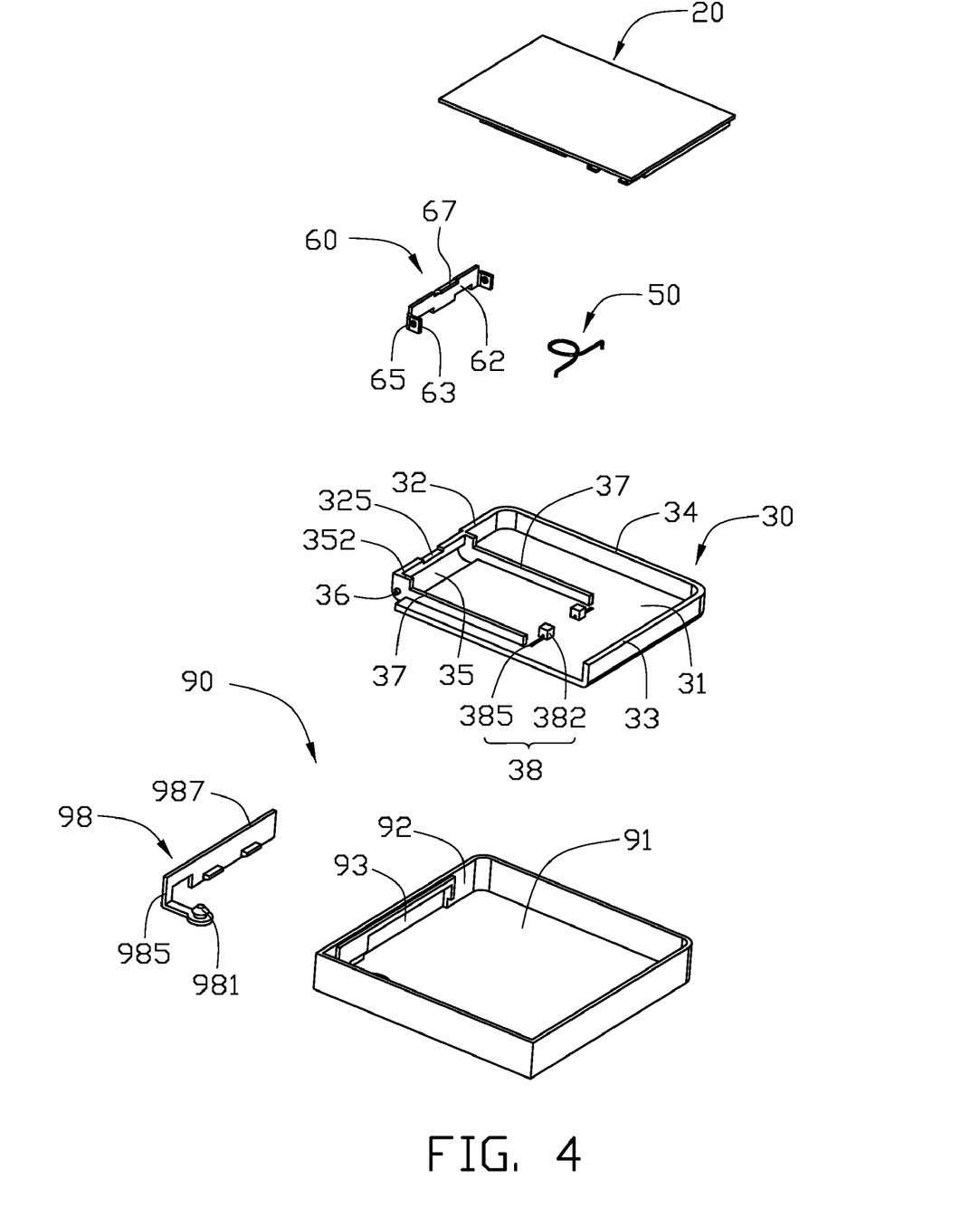
FIG. 4 is similar to FIG. 3, but viewed from another aspect.
Figure 7:
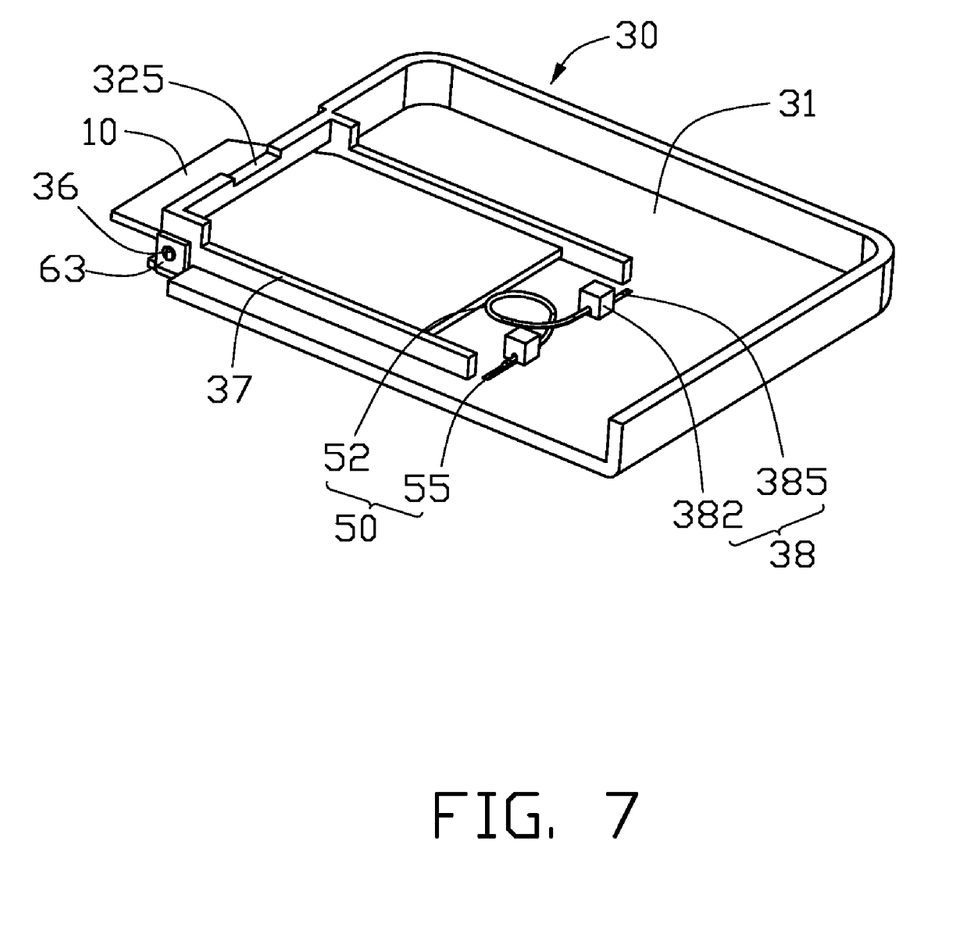
FIG. 7 is an isometric view of the card catching mechanism with a chip card received therein.

Hereinafter, the concrete structure of the card catching mechanism 80 will be explained with reference to the drawings. In the present embodiment, the card catching mechanism 80 is integrated with an antenna carrier of the portable electronic device 100. Referring to FIGS. 3 and 4, the card catching mechanism 80 includes an antenna base 20, a housing 30, an elastic member 50 and a hatch 60. The antenna base 20 includes a bottom plate 22, an antenna mask 25 and a connector 27. The bottom plate 22 is substantially rectangular-shaped and may be a printed circuit board. The bottom plate 22 includes an upper surface 221 having an antenna module (not shown) arranged thereon. The antenna mask 25 is substantially "L"-Shaped and covers the antenna module. The connector 27 is arranged on a portion of the upper surface 221 that is not covered by the antenna mask 25, and is configured (structured and arranged) for electrically connecting the chip card as shown in FIG. 7.

The housing 30 is substantially rectangular-shaped and includes a rectangular-shaped top cover 31, a circumferential wall 32, 33, 34 vertically extending from edges of the top cover 31, a hatchway 35, two installing spindles 36, two guide walls 37, and an elastic-member installing section 38. In this embodiment, the circumferential wall includes a first sidewall 32, a second sidewall 33 parallel to the first sidewall 32, and a third sidewall 34 connected between the first sidewall 32 and second sidewall 33. The corners formed by the ends of the third sidewall 34 connecting to an end of the first sidewall 32 and an end of the second sidewall 33 are rounded. A rectangular slot 325 is defined in an end of the first sidewall 32 and the rectangular slot 325 is located away from the top cover 31. The hatchway 35 is rectangular-shaped and is partially defined in the first sidewall 32 and partially defined in the top cover 31.

As shown in FIG. 3, two sidewalls 352 are respectively formed on two lateral sides of the hatchway 35. The top cover 31 and the first side wall 32 cooperatively define two cutouts 350 beside the side walls 352. The two installing spindles 36 are substantially cylindrical-shaped, and protrude from the sidewalls. The two parallel guide walls 37 are substantially rectangular and are arranged on the top cover 31. The two guide walls 37 extend from the two sidewall 352 to the second sidewall 33. The two guide walls 37, the top cover 31, the first sidewall 32, and the elastic-member installing section 38 cooperatively define a substantially rectangular space for receiving the chip card 10 therein. The elastic-member installing section 38, including two abutting blocks 382 and two sliding grooves 385, is arranged between ends of the two guide walls 37 that are located away from the hatchway 35. The abutting blocks 382 are substantially rectangular blocks arranged between two guide walls 37 on the top cover 31, and are spaced from each other. The two sliding grooves 385 are substantially rectangular and parallel to the hatchway 35.

Each groove 385 is partially covered by the corresponding block 382. Specifically, a major part of each sliding groove 385 is arranged between the corresponding guide wall 37 and the corresponding abutting block 382, while the remaining part of the sliding groove 385 passes through the corresponding abutting block 382.

The elastic member 50 is a spring including a spring body 52 bent to be α-shaped and two card-holding ends 55 oppositely arranged on the ends of the spring body 52. The outer diameter of the card-holding end 55 is substantially the same with the width of the sliding groove 385 so that the card-holding ends 55 are configured to be inserted into the sliding grooves 385.

The hatch 60 is a substantially U-shaped rectangular body and is rotatably attached to two sides of the hatchway 35 for exposing or hiding the hatchway 35. The hatch 60 includes a main body 62, two bent ends 63, two engaging bores 65, and a latch 67. The main body 62 is a substantially rectangular plate whose length and width are the same with those of the hatchway 35 on the first sidewall 32. The two bent ends 63 are formed by vertically bending two ends of the main body 62. The two engaging bores 65 are circular through holes defined in a central portion of the two bent ends 63 for receiving the installing spindles 36 of the housing 30 as the bent ends 63 are engaged with the cutouts 350. The latch 67 extends from a central portion of the main body 62 toward a direction, which is the same with bending direction of the two bent ends 63. The latch 67 is secured to the rectangular slot 325 of the first sidewall 32.

Figure 5:
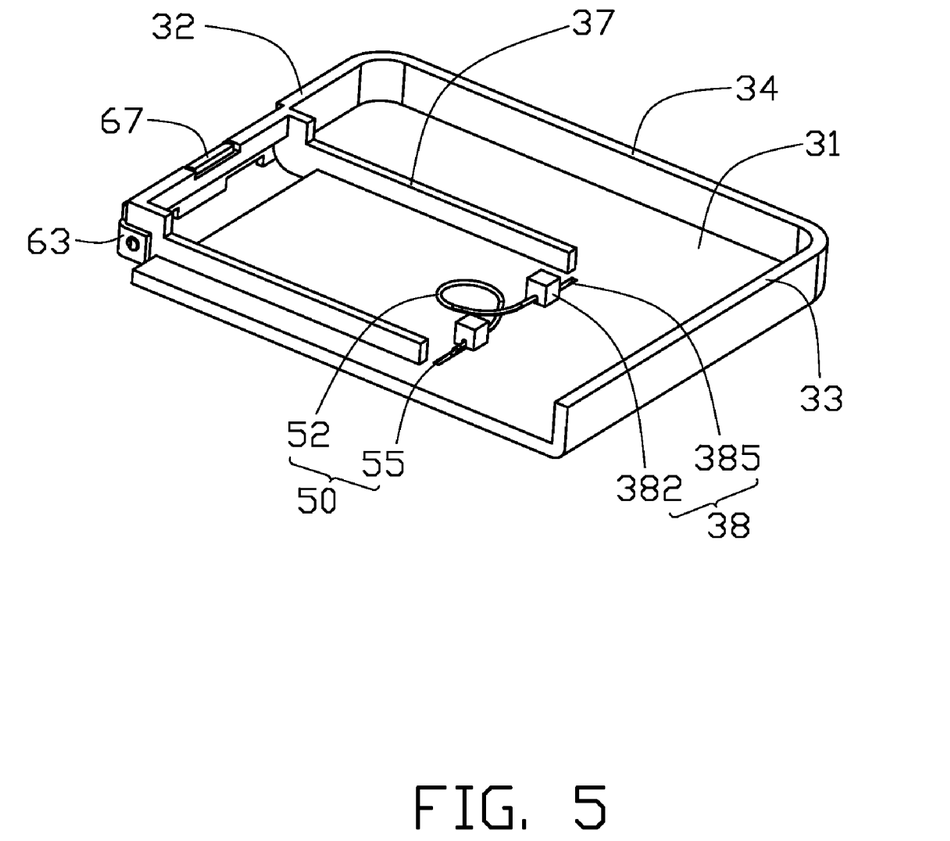
FIG. 5 is an assembled isometric view of the card catching mechanism shown in FIG. 4.
Figure 6:
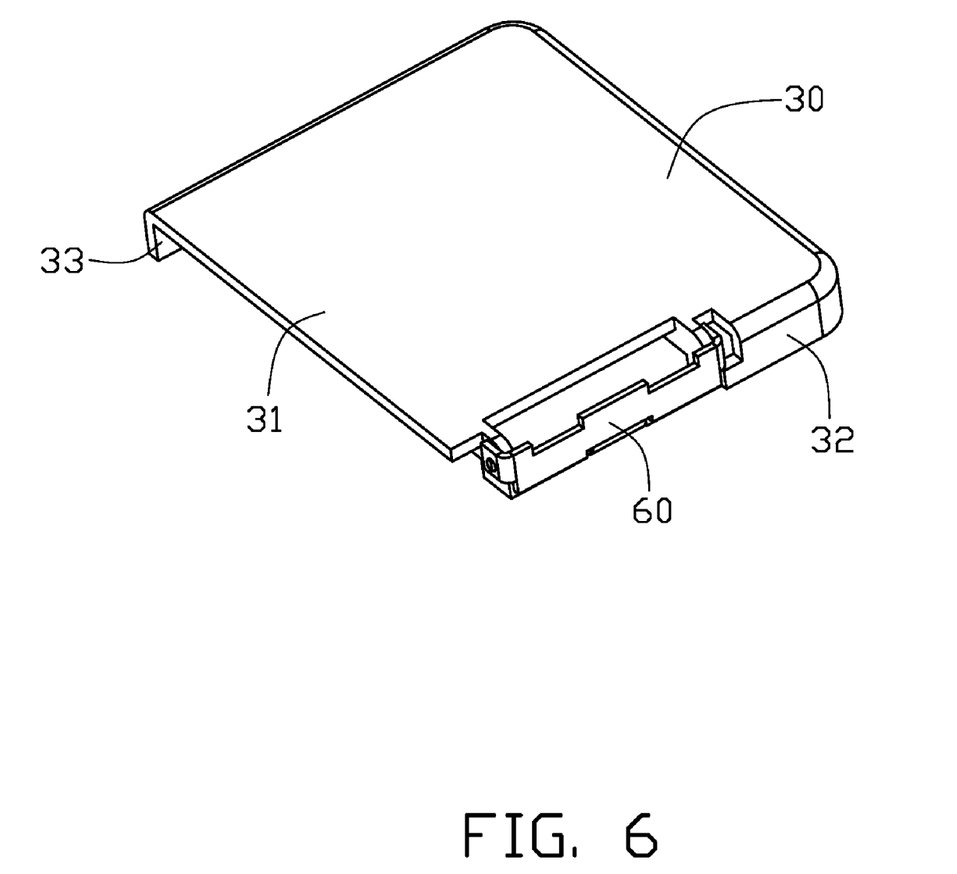
FIG. 6 is similar to FIG. 5, but viewed from another aspect.

In assembly, firstly, the card-holding ends 55 of the elastic member 50 are inserted into the two abutting blocks 382 of the elastic-member installing section 38. The spring body 52 of the elastic member 50 is arranged toward the hatchway 35 as shown in FIG. 5. Referring to FIGS. 3 and 4, the engaging bores 65 of the bent ends 63 of the hatch 60 are respectively engaged with the two installing spindles 36. The latch 67 on the main body 62 of the hatch 60 is fit to the rectangular slot 325 of the first sidewall 32. Lastly, the upper surface 221 of the antenna base 20 is aligned with a space cooperatively defined by the two guide walls 37, the top covers 31, the first sidewall 32, and the elastic member installing section 38 and the antenna base 20 is then fit into the space so as to assemble the housing 30 with the antenna base 20.

FIG. 7 shows an operating process of inserting a chip card 10 to the housing 30 by a user. The chip card 10 is firstly inserted into the housing 30 from the hatchway 35, and then inwardly pushed along the guide walls 37 on the top cover 31 until the elastic member 50 contacts with the chip card 10. After that, the two card-holding ends 55 of the elastic member 50 are inserted into the sliding grooves 385, and the elastic member 50 accumulates elastic energy at the same time. When the chip card 10 is completely inserted into the space cooperatively defined by the two guide walls 37, the top cover 31, the hatchway 35 and the elastic-member installing section 38, the hatch 60 (only one of the bent ends 63 is shown in the figure) is then rotated downward around the two installing spindles 36 until the latch 67 of the hatch 60 clasps an edge of the rectangular slot 325 on the first sidewall 32. Thus, the chip card 10 is secured by the hatch 60. It can be understood that by opening the hatch 60, the chip card 10 will be ejected from the housing 30 due to the elastic restoration of the elastic member 50. As a result, the chip card 10 may be conveniently removed from the housing 30.

As shown in FIGS. 1 and 2, the card catching mechanism 80 is assembled in a chassis 90. The detail components of the chassis 90 are shown in FIGS. 3 and 4. The chassis 90 defines a substantially rectangular-shaped cavity with one end communicating to the outside and one end covered, i.e., the chassis 90 is half-closed. The chassis 90 includes a bottom panel 91, a circumferential wall 92 vertically extending from edges of the bottom panel 91, and a soft cover 98. The circumferential wall 92 and the bottom panel 91 cooperatively define the cavity. A rectangular hole 93 is defined through a center of the circumferential wall 92. The size of the rectangular hole 93 is substantially equivalent to that of the hatchway 35 of the housing 30. A circular recess 94 is defined on the bottom panel 91, and a circular bore 95 is formed through the bottom of the circular recess 94. The circular recess 94 and the circular bore 95 communicate with each other and are coaxially arranged with each other. A connecting trench 97 is defined in the circumferential wall 92 and the bottom panel 91 and communicates the rectangular hole 93 to the recess 94.

The soft cover 98 is made from soft material, such as rubber and soft plastics, and is integrally formed within a mold. The soft cover 98 has one end arranged on the bottom panel 91 of the chassis 90, and the other end attached to the rectangular hole 93. The soft cover 98 includes a substantially keyhole-shaped fixing portion 981 connected by a connecting strip 985 to a cover portion 987. The fixing portion 981 is configured for being received in the circular recess 94 and the circular bore 95. The connecting strip 985 is configured for being received in the connecting slot 97 of the chassis 90. The cover portion 987 is substantially rectangular-shaped and is configured for being received in the rectangular hole 93 of the chassis 90.

In the assembly process of the portable electronic device 100, the card catching mechanism 80 is firstly arranged in the recess 75 of the body 70 of the portable electronic device 100. Secondly, the rectangular hole 93 and soft cover 98 of the chassis 90 are respectively aligned to the hatch 60 of the card catching mechanism 80. Lastly, the card catching mechanism 80 is covered by the chassis 90.

It can be understood that the card catching mechanism 80 is not limited to be arranged within the antenna base of the preferred embodiment. The card catching mechanism 80 may be directly arranged on the body 70 of the portable electronic device 100. The chassis 90 of the portable electronic device 100 may be omitted. The card catching mechanism 80 is not limited to be applied within the portable electronic device 100. The card catching mechanism 80 can also be applied to other electronic devices, such as digital camera, for receiving memory card or memory stick.

The present card catching mechanism 80 is arranged within an antenna carrier (not shown) of the portable electronic device 100. In addition, the hatch 60 is rotatably installed on two lateral sides of the hatchway 35 for exposing or hiding the hatchway 35 of the housing 30. With such design, the space occupied by the antenna carrier is efficiently used. Further, the user may directly access the chip card 10 by opening the soft cover 98 and the hatch 60 via the side portion 72 of portable electronic device 100 without removing the battery of the portable electronic device 100 thereby simplifying the process of replacing the chip card 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A chip card catching mechanism installed in a body of a portable electronic device for receiving and securing a chip card, the chip card catching mechanism comprising:

a base with a connector arranged thereon for electrically connecting to the chip card;

a housing including a top cover being arranged over the connector of the base and a circumferential wall extending from edges of the top cover, the circumferential wall defining a hatchway therethrough; and a hatch rotatably fixed to two sides of the hatchway for exposing or hiding the hatchway.

2. The chip card catching mechanism of claim 1, wherein the hatchway is partially defined in the circumferential wall and partially defined in the top cover, and two sidewalls with installing spindles are formed on two lateral sides of the hatchway.

3. The chip card catching mechanism of claim 2, wherein the catching portion comprises a main body, and two bent ends being vertical to the main body, each of the bent ends has an engaging bore defined thereon for respectively engaging with the installing spindles.

4. The chip card catching mechanism of claim 3, wherein the hatch further comprises a latch extending from a central portion of the main body.

5. The chip card catching mechanism of claim 2, wherein two guide walls arranged on the top cover extend from the two sidewalls to a second sidewall parallel to the sidewalls.

6. The chip card catching mechanism of claim 5, wherein the housing further comprises an elastic-member installing section arranged between ends of the two guide walls for installing an elastic member.

7. The chip card catching mechanism of claim 6, wherein the elastic-member installing section comprises two abutting blocks and two sliding grooves, the abutting blocks are arranged between two guide walls and are spaced from each other, the sliding grooves are parallel to the hatchway and a major part of each of the sliding grooves is arranged between the corresponding guide wall and the corresponding abutting blocks.

8. A portable electronic device comprising a body and a chip card catching mechanism installed in the body, the chip card catching mechanism comprising:

a base with a connector arranged thereon for electrically connecting to the chip card;

a housing including a top cover being oppositely arranged to the connector and a circumferential wall extending from edges of the top cover, the circumferential wall defining a hatchway therethrough; and a hatch rotatably installed on two sides of the hatchway for exposing or hiding the hatchway.

9. The portable electronic device of claim 8, wherein the hatchway is partially defined in the circumferential wall and partially defined in the top cover, and two sidewalls with installing spindles are formed on two lateral sides of the hatchway.

10. The portable electronic device of claim 9, wherein the catching portion comprises a main body, and two bent ends being vertical to the main body, each of the bent ends has an engaging bore defined thereon for respectively engaging with the installing spindles.

11. The portable electronic device of claim 10, wherein two guide walls arranged on the top cover extend from the two sidewalls to a second sidewall parallel to the sidewalls.

12. The portable electronic device of claim 11, wherein the housing further comprises an elastic-member installing section arranged between ends of the two guide walls for installing an elastic member.

13. The portable electronic device of claim 12, wherein the elastic-member installing section comprises two abutting blocks and two sliding grooves, the abutting blocks are arranged between two guide walls and are spaced from each other, the sliding grooves are parallel to the hatchway and a major part of each of the sliding grooves is arranged between the corresponding guide wall and the corresponding abutting blocks.

14. The portable electronic device of claim 13, wherein the hatch further comprises a latch extending from a central portion of the main body.

15. The portable electronic device of claim 14, further comprising a chassis with a cavity for receiving the card catching mechanism.

16. The portable electronic device of claim 15, wherein the chassis comprises a bottom panel, a circumferential wall extending from edges of the bottom panel and a soft cover, the circumferential wall defines a rectangular hole, and one end of the soft cover is arranged on the bottom panel, and the other end is attached to the rectangular hole.

17. The portable electronic device of claim 16, wherein the bottom panel further comprises a circular recess with a bore arranged thereon, and a connecting trench for communicating the rectangular hole to the recess.

18. The portable electronic device of claim 17, wherein the soft cover comprises a fixing portion, a cover portion, and a connecting strip for connecting the fixing portion to the cover portion, the fixing portion is configured for engaging with the recess of the chassis, and the cover portion is configured for engaging with the rectangular hole of the chassis.

* * * * *